United States Patent [19]

Dedolph

[11] 4,213,273
[45] * Jul. 22, 1980

[54] FIELD TRANSPLANT SYSTEMS AND METHODS AND COMPONENTS THEREOF

[75] Inventor: Richard R. Dedolph, Naperville, Ill.

[73] Assignee: Gravi-Mechanics Co., Naperville, Ill.

[*] Notice: The portion of the term of this patent subsequent to Jul. 12, 1994, has been disclaimed.

[21] Appl. No.: 928,839

[22] Filed: Jul. 28, 1978

Related U.S. Application Data

[62] Division of Ser. No. 772,094, Feb. 25, 1977, Pat. No. 4,130,072.

[51] Int. Cl.² ............................................. A01G 9/02
[52] U.S. Cl. ................................... 47/74; 47/DIG. 7; 71/64 R; 264/DIG. 37
[58] Field of Search ........................................ 111/2–3; 47/DIG. 7, 56, 57.6, 58, 65, 74; 71/64 R; 242/67.1 R; 264/239, DIG. 37; 253/562

[56] References Cited

U.S. PATENT DOCUMENTS

| | | | |
|---|---|---|---|
| 1,486,431 | 3/1924 | Harvey | 47/74 |
| 1,645,001 | 10/1927 | Hodges | 47/57.6 X |
| 3,373,009 | 3/1968 | Pruitt et al. | 71/64 R |
| 3,467,609 | 9/1969 | Adams et al. | 47/65 X |
| 3,608,238 | 9/1971 | Reuter | 47/64 |
| 3,842,537 | 10/1974 | Bishop | 47/74 |
| 3,973,355 | 8/1976 | McKenzie | 47/57.6 X |
| 4,034,508 | 7/1977 | Dedolph | 47/67 |
| 4,130,072 | 12/1978 | Dedolph | 47/56 |

Primary Examiner—E. H. Eickholt
Attorney, Agent, or Firm—Vogel, Dithmar, Stotland, Stratman & Levy

[57] ABSTRACT

A field transplant system including a machine for sequentially forming groups of polymerized soil plugs having seed receiving recesses in one end thereof and supported on a carrier, and in certain cases interconnected by strips, the carrier being used to transport the soil plugs through a seeding station and then to a germination station and then to a growing station either in the flat or on a plant turning machine in a greenhouse to grow the germinated seeds to transplant size, and then using the carrier to transport the soil plugs with the transplants growing therein to the field for transplanting by an automatic transplanter; several forms of soil plugs are disclosed, and several methods for supplying seeds to the soil plugs are disclosed, as well as an improved method of mounting a mat of soil plugs on the cylinder of a plant turning machine.

7 Claims, 23 Drawing Figures

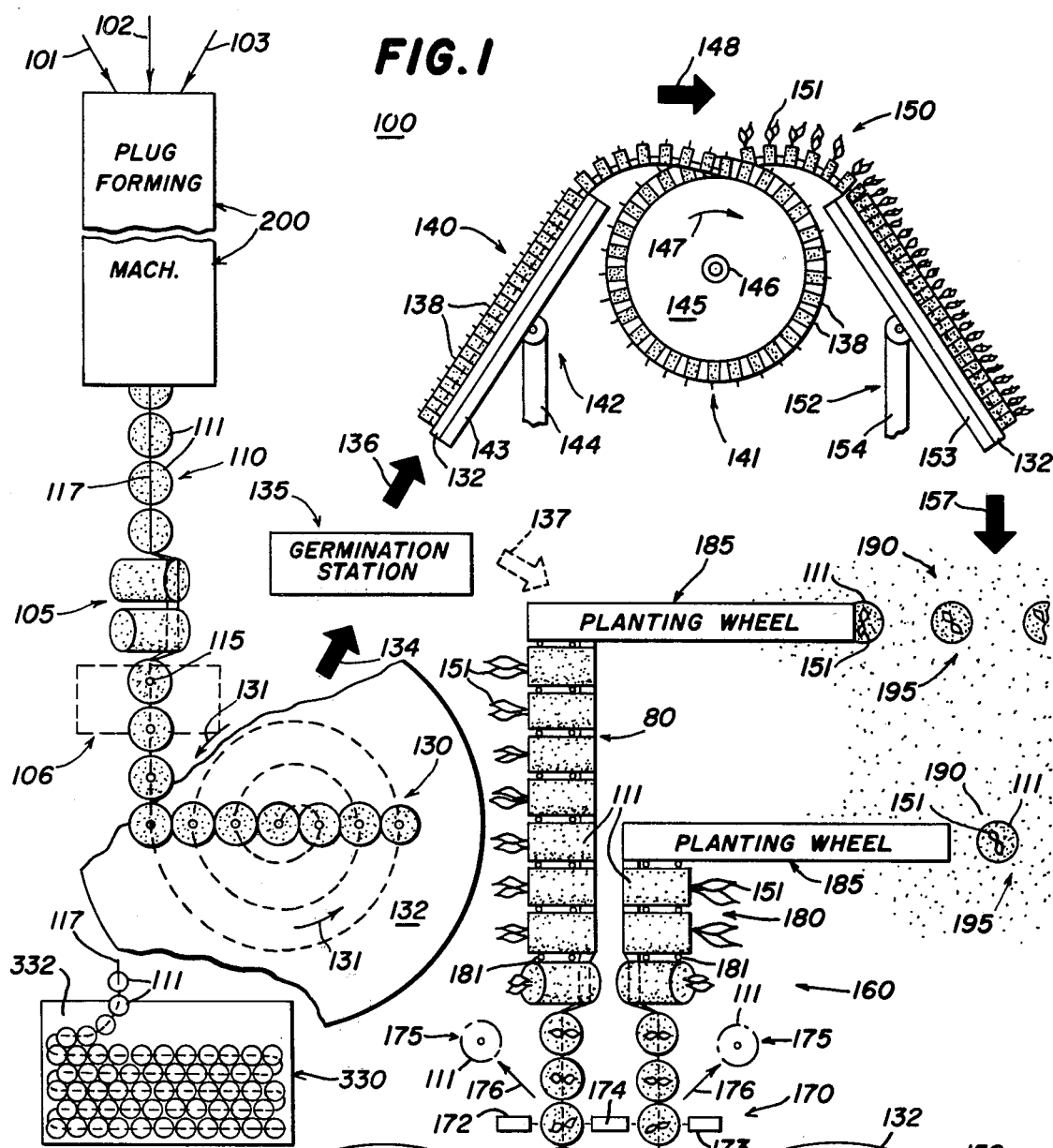
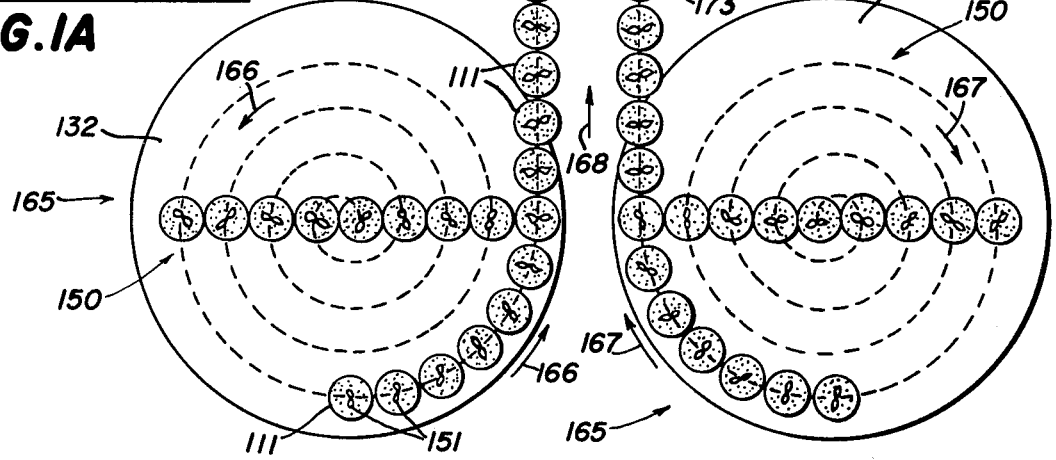
FIG. 1
FIG. 1A

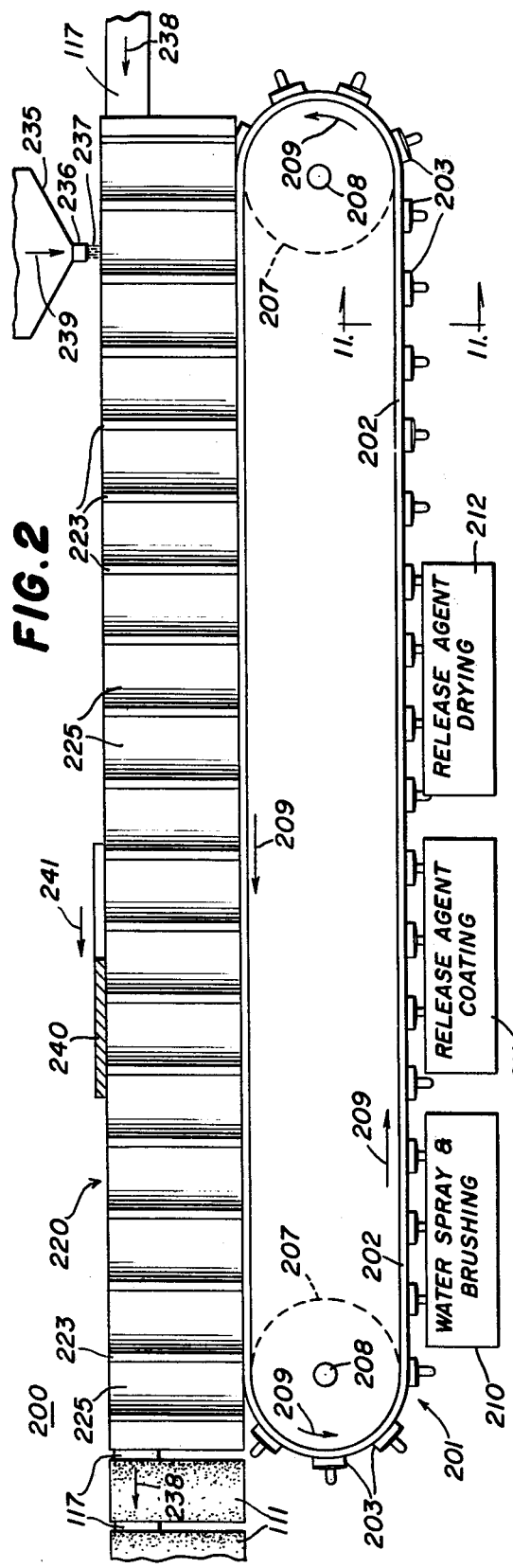
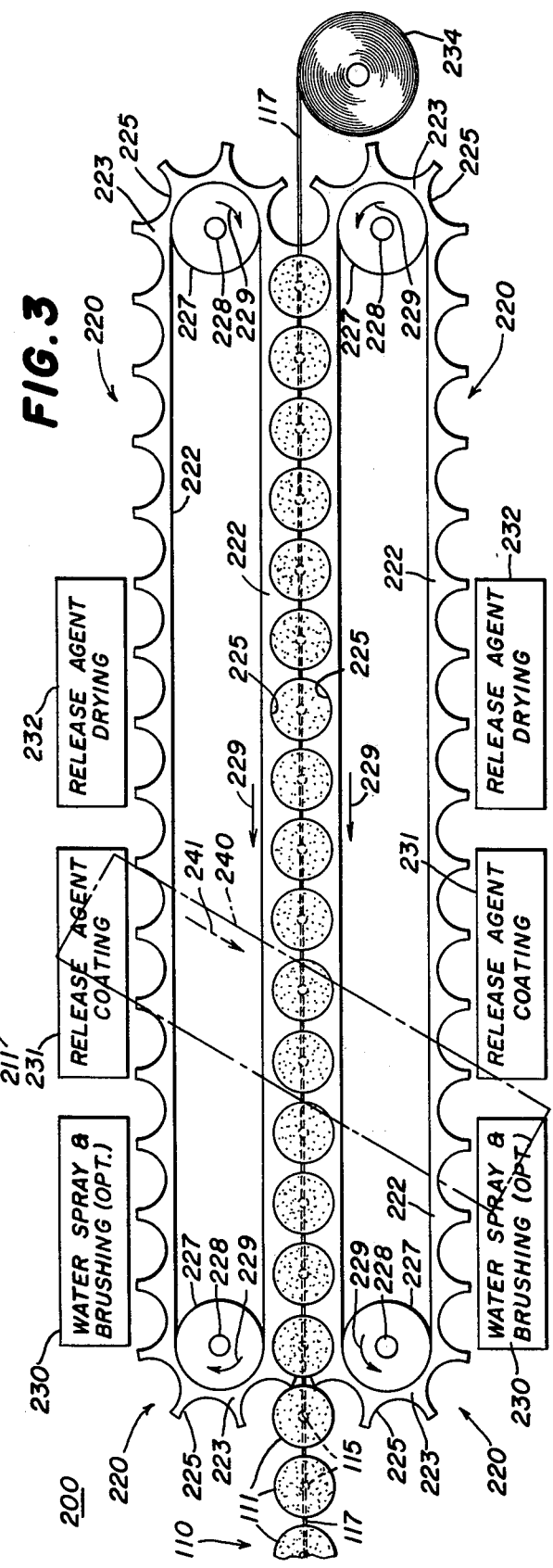

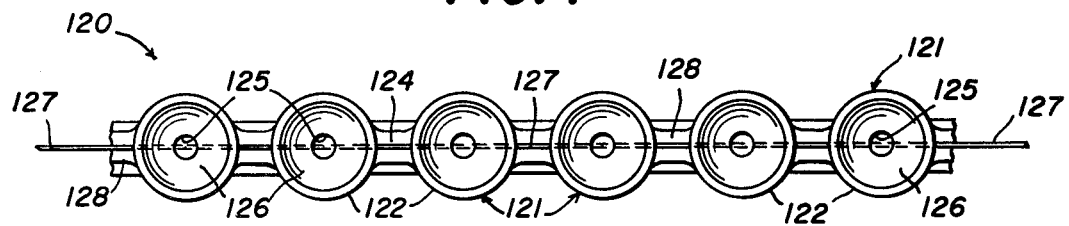
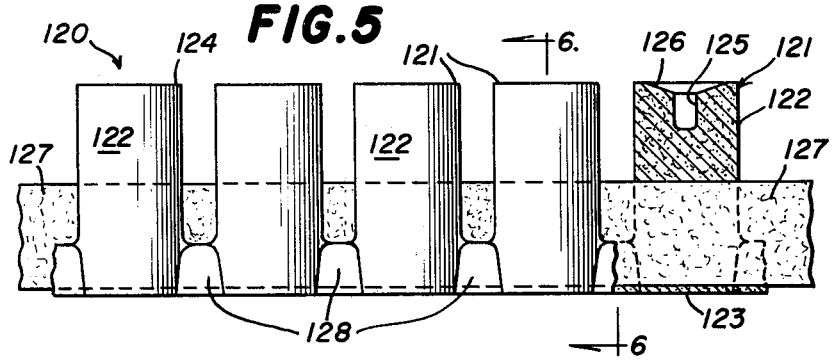
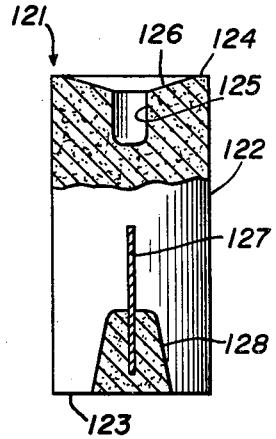
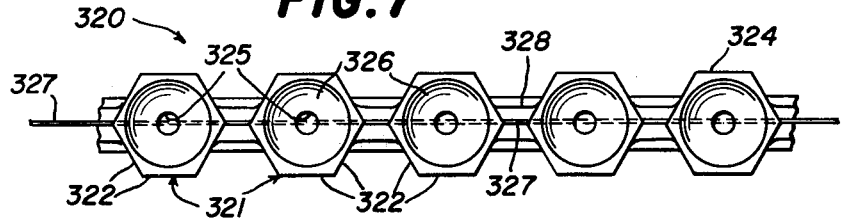
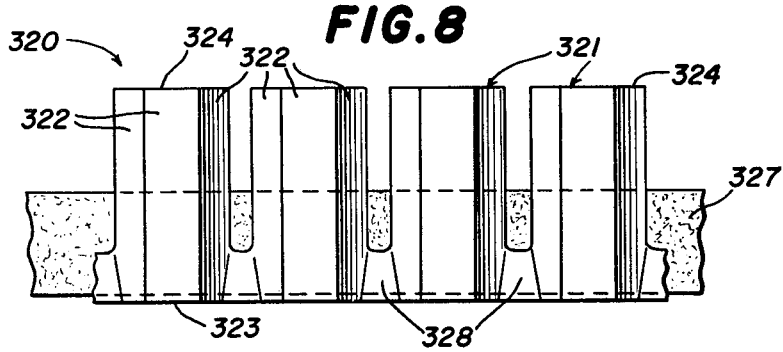
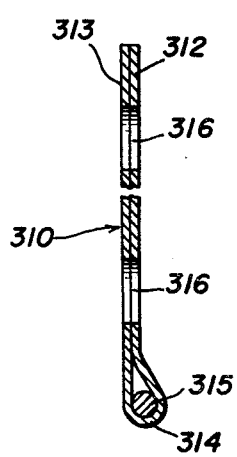
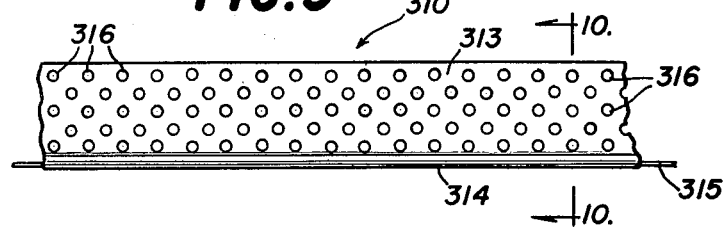

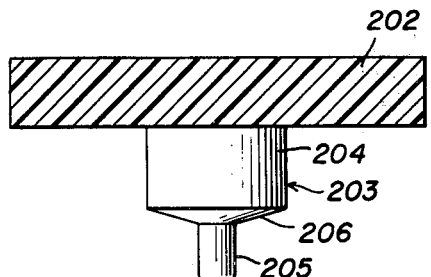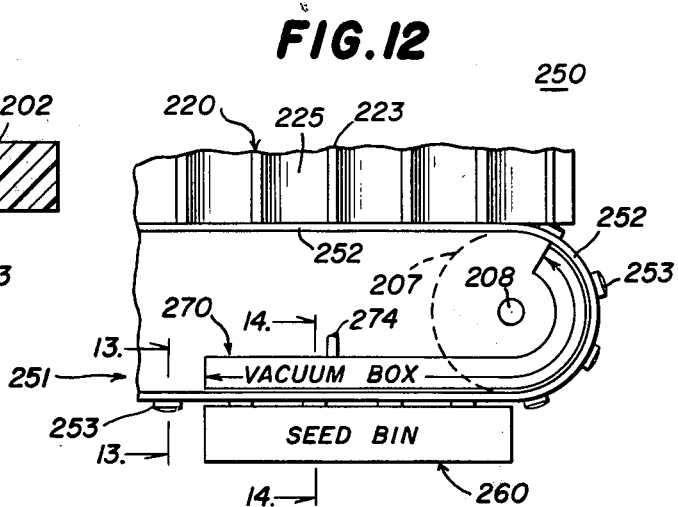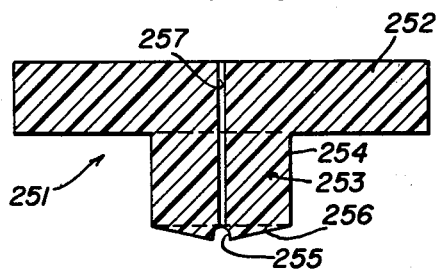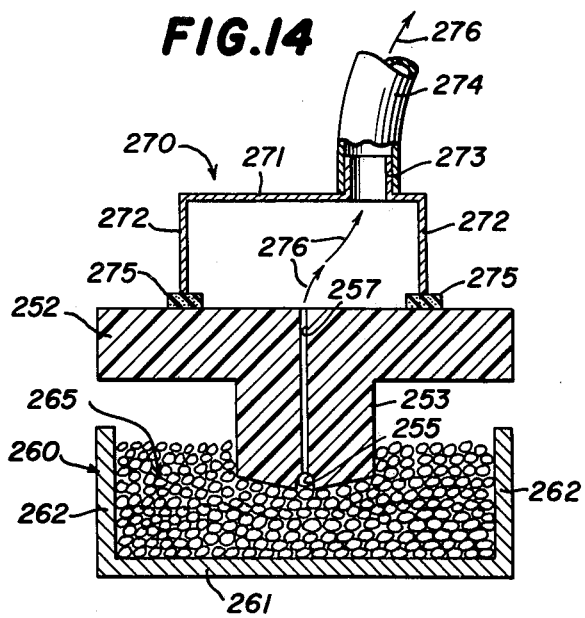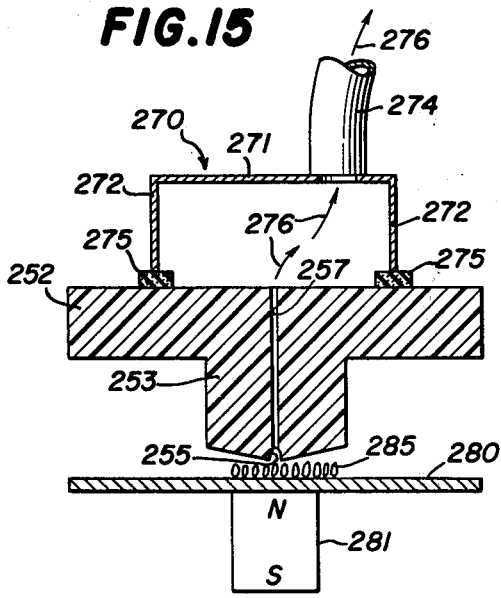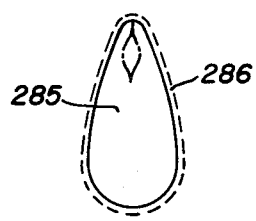

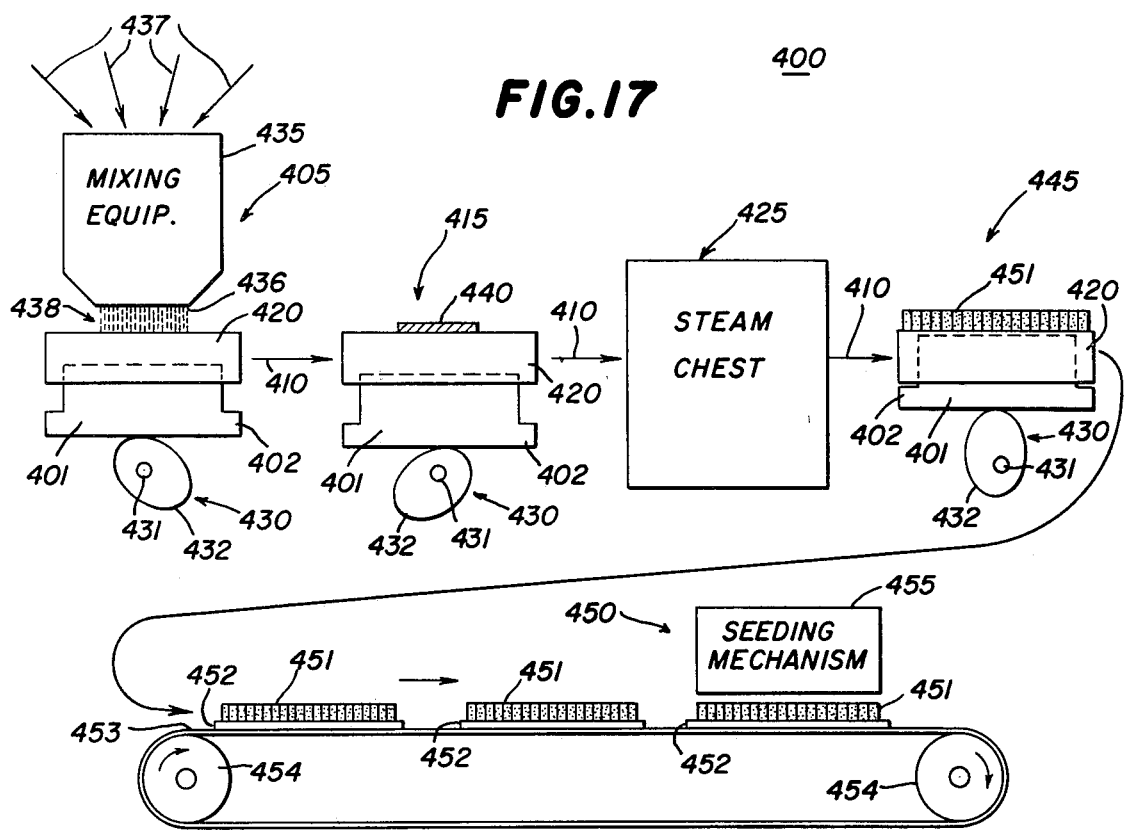
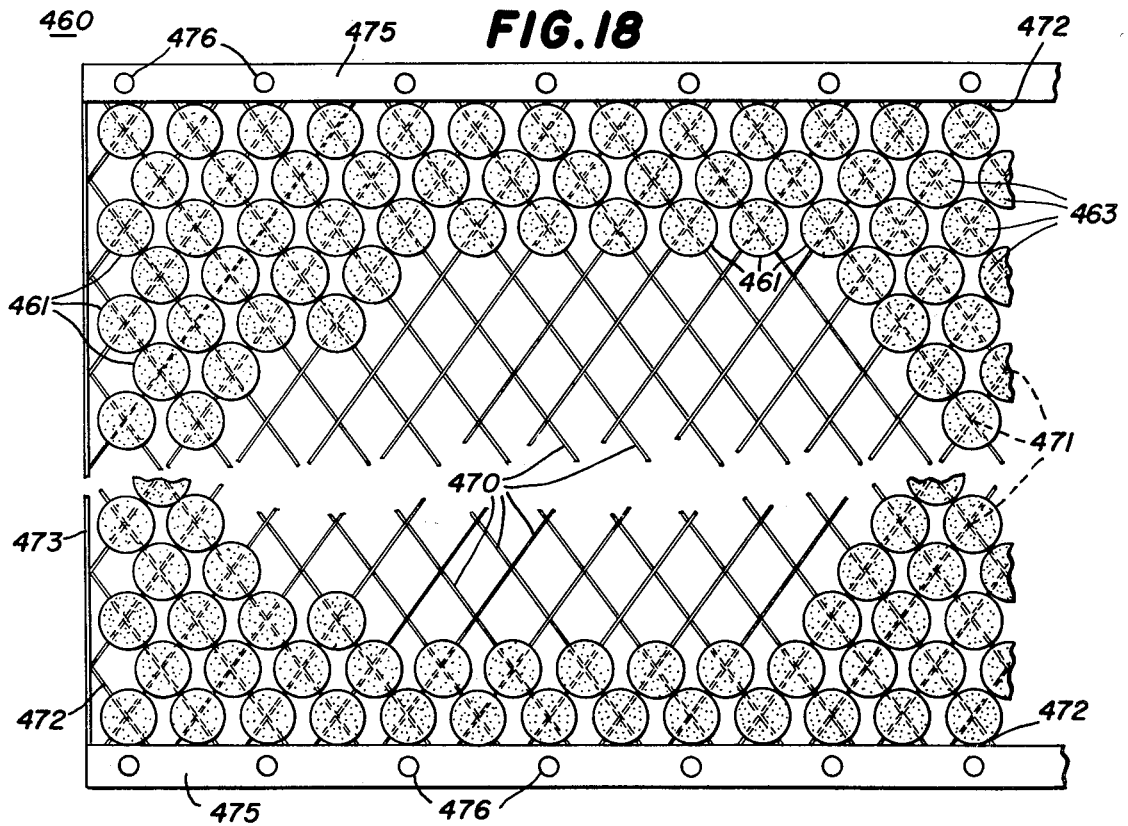

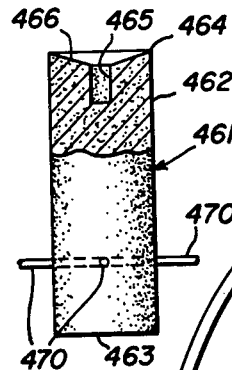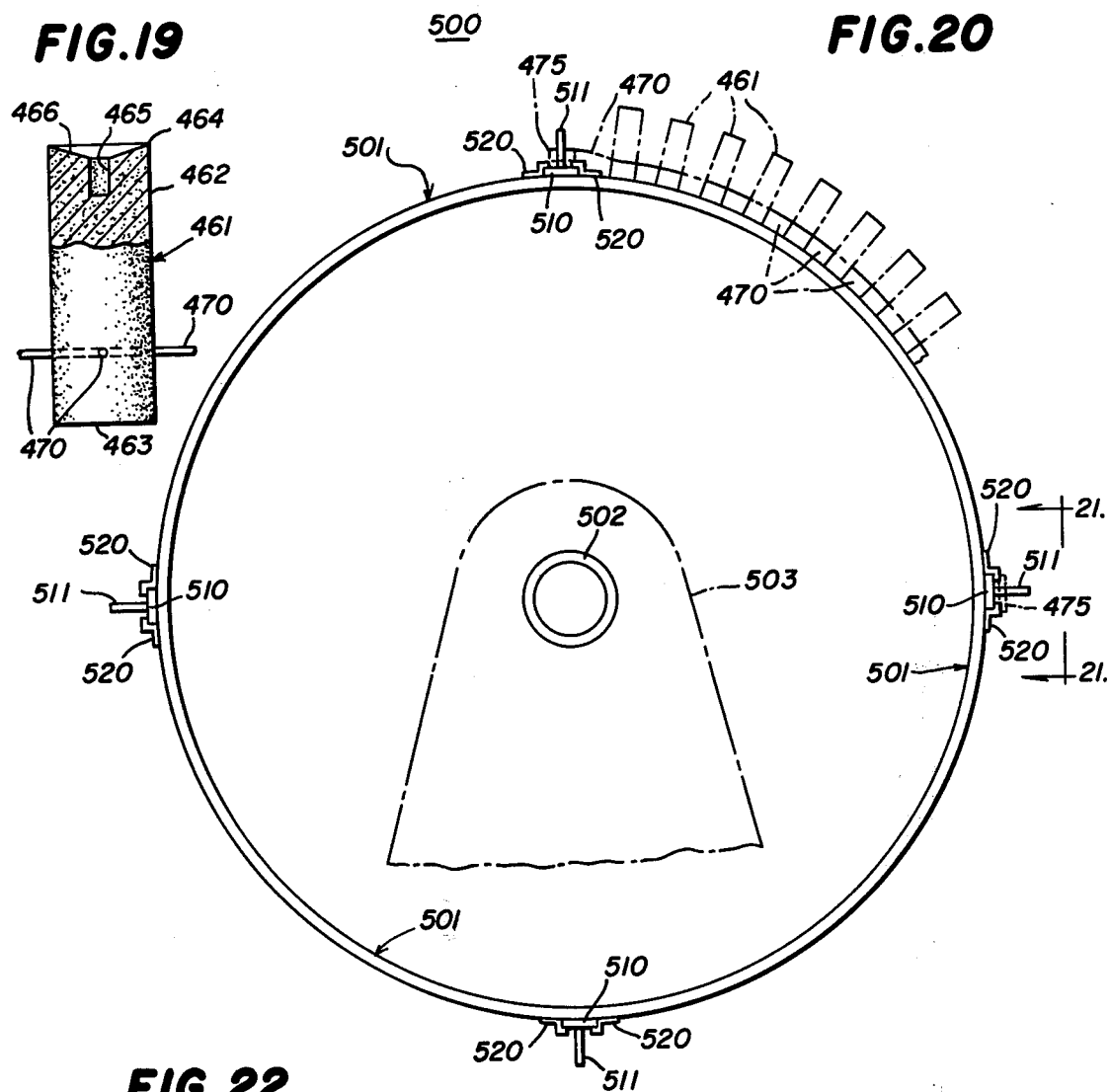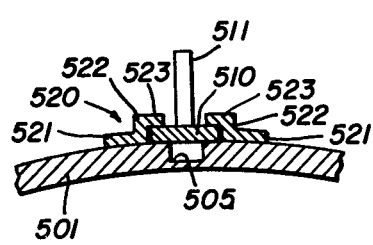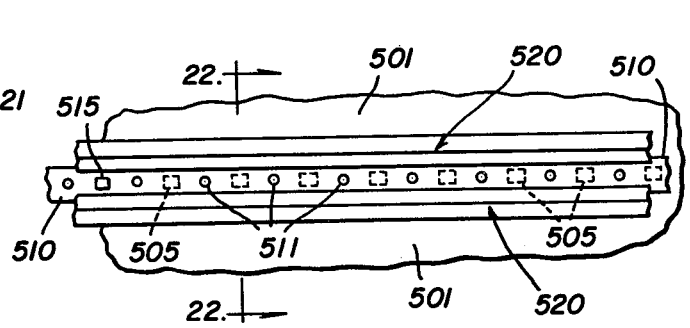

FIELD TRANSPLANT SYSTEMS AND METHODS AND COMPONENTS THEREOF

This is a division of application Ser. No. 772,094, filed Feb. 25, 1977, now U.S. Pat. No. 4,130,072.

BACKGROUND OF THE INVENTION

The present invention relates generally to improvements in field transplant systems and methods and components thereof, wherein polymerized soil plugs are formed and seeded, the seeds germinated and grown to provide plants that are of field transplant size, and the plants being thereafter automatically planted in a field.

The ideal time to transplant seedlings or plants is when the plants are still quite small; for example, in the case of lettuce seedlings, the ideal transplant time is after the first true leaf has partially expanded, this being approximately twelve to fifteen days after planting; in the case of celery, the ideal transplant time is after the first true leaf has partially expanded, this being approximately twenty-five to thirty days after planting. Prior transplant systems have required plants to be substantially greater in size, the typical commercial head lettuce transplant having grown for twenty-five to forty days in a greenhouse after planting, and the typical commercial celery transplant having grown fifty to seventy-five days in a greenhouse after planting.

Transplanting the seedling when it is still quite small has several advantages: (1) the root system is less fully differentiated so that more roots on the seedling are hair roots and water absorbing; (2) the top or leaf the plant does not put a too great a water demand on the root system, i.e., a water demand beyond the capacity of the root system to provide water; (3) the growth system of the plant has not yet been physiologically modified so as to require the sophisticated greenhouse growing conditions; and (4) if the transplant is put in the field soil at an angle of even 45° with respect to the vertical, the stalk will straighten up and grow upright without deforming the mature plant.

Ideally the seeds for field transplant production are subjected to uniform germination conditions, and more uniform germination of seeds is obtained if: (1) there is good contact between the seed and the soil surrounding it; (2) there is ready access by the seed to the oxygen in the air since the sprouting seed requires oxygen for respiration and its normal growth processes; and (3) water is supplied directly to the seed with excess water draining away from the seed, but the seed being maintained continually in a moist condition. Prior commercial transplant systems have not provided these ideal germination conditions since they have required layers of soil to be applied over the seeds, and there has been no special controlled provisions made for aeration and watering of the seed during germination.

One form of prior field transplanting system, known as the "Speedling" system, utilizes a seedling flat as illustrated in the Todd U.S. Pat. No. 3,667,159 granted June 6, 1972. The flat of the Todd patent is formed of plastic and includes a number of downwardly tapered soil cells in which individual seedlings are started. The soil utilized is frequently a mixture of peat and vermiculite because such a mixture is readily handled in conventional mixing and dispensing apparatus. After seeding, the flat is held in a greenhouse until the seedlings are the size required for transplanting, after which the flat is taken to the field where the seedlings are to be transplanted. The seedlings are manually removed from the flat, and in the process, 25% to 60% of the soil falls from the roots so that essentially a bare root seedling is manually fed to a transplanter which grasps the seedling by the stalk and moves it to the transplanted position in the soil.

Since the seedling must be handled by its stalk during the transplanting operation in accordance with the "Speedling" system, the seedling must be of substantial size, and in the case of lettuce, the seedling has been grown for twenty-five to fifty days in the greenhouse, twenty-eight days being typical, and in the case of celery, has been grown fifty to seventy-five days in the greenhouse, sixty days being typical. As a consequence, the seedlings are well past the ideal transplant stage which is about fifteen days in greenhouse cultivation for lettuce and about thirty in greenhouse cultivation for celery. Despite the greater size of the plants in the "Speedling" system, there is substantial "transplanting shock" as evidenced by the fact that despite the usual twenty-eight days greenhouse growth of the seedling prior to transplant, in comparison to direct seeding, there is only an advance of ten to fifteen days in the harvest date; thus showing that on an average there is a fifteen day loss from "transplanting shock". Transplanting shock results from a substantial loss of the water absorbing hair roots when 25% to 60% of the soil falls from the roots during the manual feeding of the seedling to the transplanter. In addition, the leaf development on a twenty-eight day lettuce seedling is large compared to the resultant root capacity after transplanting so that the plants must be quickly watered or a substantial loss or mortality will result. Further it is clear that the twenty-eight day lettuce seedlings have been physiologically modified due to their long holding time under greenhouse growing conditions, whereby there is the resultant shock when the seedling is exposed to the normally more rigorous field conditions. Furthermore, if the twenty-eight day lettuce seedling is not planted with the stalk extending essentially upwardly, there may develope a deformation of the mature plant which renders the resultant head of lettuce less valuable in the market place.

Another prior transplanting system is illustrated in the Huang et al. U.S. Pat. No. 3,446,164 granted May 27, 1969 and the Huang U.S. Pat. No. 3,712,263 granted Jan. 23, 1973. These patents disclose a tobacco transplant system wherein tobacco seedlings are grown in a compartmentalized tray having a plurality of cells therein, each cell containing a quantity of soil in which the seedling is grown under greenhouse conditions. The soil masses held together by the roots of the seedling are then planted using the transplanter of U.S. Pat. No. 3,446,164 which utilizes vacuum to pull the soil masses from a tray thereof and deposits the same in an opening formed in the soil.

Since the Huang et al. system relies upon a well developed root system to hold the soil masses together during transplanting, again the transplant seedling has a size well beyond the ideal for transplanting. As a result, there may be substantial "transplanting shock". This is caused by a combination of factors including the fact that the top of the plant is large compared to the root system, whereby there is substantial tendency to wilt until the root system is reestablished. Further, the more mature plant has had its growth system physiologically modified in response to the non-taxing greenhouse holding conditions from which it requires several days for the plant to adjust to the more rigorous field conditions usually encountered. Furthermore, since the plant is more mature, it must be placed essentially upright in the soil, otherwise the resultant mature plant is deformed and of less economic value.

Basically the problem with using more mature transplants is that they are too much differentiated to readily adapt to differing field conditions during their subsequent development.

Additional problems were encountered in the Huang et al. system in the operation of the automatic transplanter forming a part thereof. The velocity of the plant in the tube leading from the support plate to the furrow is dependent upon the integrity of the soil plug, which in turn is dependent upon the extent of the roots of the plant in the soil plug to hold the same together. Substantial difficulty has been encountered in that the roots of plants of ideal size for transplant are not sufficient to hold the soil plug together and thus provide a uniform velocity of the plant in the aforementioned tube. In an effort to further stabilize the soil plug, larger plants are provided which in turn necessitates a larger top to root ratio and a larger plant top. Since the plant top must pass through the cavity in the support tray, difficulties are inevitable.

SUMMARY OF THE INVENTION

The present invention provides field transplant systems and methods and components thereof, whereby stabilized polymerized soil plugs are formed, seeds inserted in appropriate seed recesses therein and thereafter germinated and grown to an ideal transplant size, the soil plugs with the transplants therein being automatically planted in the field, all forces required to carry the plants in the system being applied only to the soil plugs and not to the plant tops.

This is accomplished in the present invention, and it is an object of the present invention to accomplish these desired results, by providing a field transplant system including mechanism for forming polymerized soil plugs each including a body of spongy open-celled hydrophilic polymer with a quantity of particles of soil mix distributed throughout the body of spongy polymer, means for establishing a plant of transplant size in each soil plug so as to incorporate the roots of the plant therein, and planting mechanism for the soil plugs utilizing the soil plugs to move the same with the plants therein to a growing position in a field with the soil plugs essentially buried in the soil in the field and the plants growing upwardly therefrom.

Another object of the invention is to provide a field transplant system of the type set forth wherein a carrier is provided for a group of soil plugs useful in conveying the same throughout the field transplant system.

Yet another object of the invention is to provide a field transplant system of the type set forth wherein the plants are grown to transplant size on a plant turning machine engaging the soil plugs so as to accelerate the growth of the plants therein.

Still another object of the invention is to provide a field transplant method comprising the steps of forming polymerized soil plugs each having a seed recess in one end thereof and each including a body of spongy open-celled hydrophilic polymer with a quantity of particles of soil mix distributed throughout the body of spongy polymer, placing a seed in each of the recesses and applying water thereto and maintaining the portion of the soil plug around each recess moist to facilitate germination of the seed therein, placing the soil plugs with the germinated seeds therein in light and applying water to cause the germinated seeds to grow to transplant size wherein the first true leaf is partially expanded, and thereafter carrying the plugs with the transplants therein to a field with all forces required to carry the plants being applied only to the soil plugs and not to the plant tops, and placing the soil plugs in a growing position in the field with the soil plugs essentially buried in the soil of the field and the plants growing upwardly therefrom.

Yet another object of the invention is to provide a polymerized soil plug for growing a plant therein from seed including a body of spongy open-celled hydrophilic polymer, a quantity of particles of soil mix distributed throughout the body of spongy polymer, and a quantity of foam-forming synthetic organic plastic resin being reacted in situ to form the body of spongy open-celled hydrophilic polymer binding the particles of soil mix therein and into a cohesive soil plug, the resin comprising from about 20% to about 80% by dry weight of the soil plug thereby to provide a unitary self-supporting firm polymerized soil plug, the soil plug having generally longitudinally extending side wall and generally transversely extending end walls, one of the end walls having a seed receiving recess therein with the end wall sloping from adjacent to the periphery of the soil plug inwardly towards the seed recess, the inwardly sloping end wall directing fluids into the seed recess during germination of the seeds therein.

Still another object of the invention is to provide an interconnected array of polymerized soil plugs wherein strips interconnect the soil plugs to form the interconnected array thus to accommodate ready handling thereof.

In connection with the foregoing objects, it is another object of the invention to provide an array of plugs having a growing plant disposed in one end of each of the soil plugs in the array.

Further in connection with the foregoing objects, it is another object of the invention to provide an interconnected array of soil plugs wherein each soil plug is connected by strips to adjacent soil plugs to form an interconnected mat of soil plugs, the strips having connecting portions extending outwardly beyond the periphery of the mat to accommodate handling and mounting of the mat of soil plugs.

Still another object of the invention is to provide a molding system and method for forming polymerized soil plugs comprising at least two mold element conveyors arranged to operate continually, at least two sets of mold elements respectively mounted upon the conveyors, the sets of mold elements during one portion of the path of travel of the conveyors joining to form a set of mold cavities for soil plugs and during another portion of the path of travel of the conveyors being separated to facilitate removal of the molded soil plugs therefrom and to facilitate cleaning thereof, filling means adjacent to the conveyors just beyond the point where the mold elements join to form the mold cavities for inserting therein a slurry of foam-forming synthetic organic plastic resin and a quantity of particles of soil mix, a cleaning station adjacent to the conveyors just beyond the point where the mold elements separate for cleaning the sets of mold elements, and a release agent applying station along the portion of the path of travel of the conveyors beyond the cleaning station for applying a resin release agent at least to the surfaces of the mold elements forming the mold cavities.

In connection with the preceding object, it is another object of the invention to provide a molding system wherein strips are molded into the soil plugs to form arrays of plugs.

Still another object of the invention is to provide a molding system of the type set forth in combination with a seeder for placing a seed in one end of each of the soil plugs, the seeder being either operated by gravity, vacuum or a combination of vacuum and gravity forces.

A still further object of the invention is to provide improved structure for mounting a mat of soil plugs on the cylinder of a plant turning machine.

Further features of the invention pertain to the particular arrangement of the parts and the combination of the method steps thereof, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 1 is a diagrammatic view of certain field transplant systems made in accordance with and embodying the principles of the present invention;

FIG. 1A is a diagrammatic view of a modified form of soil plug carrier useful in the field transplant system of FIG. 1;

FIG. 2 is a diagrammatic side view of one form of machine for producing soil plugs useful in the field transplant system of FIG. 1;

FIG. 3 is a diagrammatic plan view of the machine of FIG. 2;

FIG. 4 is an enlarged fragmentary view of a chain of soil plugs manufactured using a modified form of the machine of FIGS. 2 and 3, the chain of soil plugs being viewed from the top;

FIG. 5 is a view of the chain of soil plugs of FIG. 4 as seen from the side, one of the soil plugs being in section;

FIG. 6 is a view in section along the line 6—6 of FIG. 5;

FIG. 7 is a plan view of a second form of chain of soil plugs that can be made using a modified version of the machine of FIGS. 2 and 3;

FIG. 8 is a side view of the chain of soil plugs of FIG. 7;

FIG. 9 is a view of a modified form of connecting strip useful in forming a chain of soil plugs;

FIG. 10 is an enlarged view in section along the line 10—10 of FIG. 9;

FIG. 11 is an enlarged view in section through one of the seed recess forming dies of the soil plug forming machine of FIG. 2 as seen in the direction of the arrows along the line 11—11 thereof;

FIG. 12 is a fragmentary diagrammatic view of an automatic seeding station useful in a modified form of the machine of FIGS. 2 and 3;

FIG. 13 is a view in section along the line 13—13 of FIG. 12;

FIG. 14 is an enlarged view in section along the line 14—14 of FIG. 12;

FIG. 15 is a view similar to FIG. 14 but showing a different form of automatic seeding apparatus;

FIG. 16 is a diagrammatic representation on an enlarged scale of a seed useful in the seeding apparatus of FIG. 15;

FIG. 17 is a diagrammatic view of another form of soil plug forming machine made in accordance with and embodying the principles of the present invention;

FIG. 18 is a plan view with certain portions broken away of a mat of soil plugs made using the machine of FIG. 17;

FIG. 19 is an enlarged view with certain portions broken away of one of the soil plugs from the mat of FIG. 18;

FIG. 20 is a diagrammatic view of a cylinder for a plant turning machine, the cylinder incorporating therein mechanism for firmly mounting one of the soil plug mats of FIG. 18 thereon;

FIG. 21 is a fragmentary view of one of the mounting slides on the cylinder of FIG. 20 as viewed in the direction of the arrows along the line 21—21 of FIG. 20; and FIG. 22 is an enlarged fragmentary view in section along the line 22—22 of FIG. 21.

DESCRIPTION OF THE PREFERRED EMBODIMENTS

Referring to FIG. 1 of the drawings, there is illustrated a field transplant system 100 made in accordance with and embodying the principles of the present invention. The field transplant system 100 includes a soil plug forming machine 200 that produces a chain of soil plugs 110, an inverting station 105, a seeding station 106, a germination station 135, a plant turning machine 141 and a field transplanter 160. The soil plug forming machine 200 has as inputs thereto a stream 101 of synthetic organic plastic resin, a continuous tape 102 and a stream 103 of a soil mix incorporated in water to form a slurry, details of the composition of these various inputs being set forth hereinafter. The machine 200 combines the inputs to produce a chain 110 of plugs 111, each of the soil plugs 111 having a seed recess or pocket 115 in one end thereof and being interconnected by a continuous strip 117 to form the continuous chain 110. As the chain 110 of soil plugs 111 leaves the machine 200, the bottom ends of the plugs 111 are disposed upwardly with the seed pockets 115 therein disposed downwardly, and accordingly the chain 110 of plugs 111 is inverted at station 105 before being fed to the gravity seeding station 106.

At the seeding station 106, the seed pockets 115 are disposed upwardly in each plug 111 and a suitable seed which may be either naked or coated is deposited in each seed pocket 115. Thereafter the chain 110 of the plugs 111 is coiled upon a circular pallet or carrier 132 to provide a coiled seeded chain 130 of plugs, the pallet 132 turning in the direction of the arrow 131 to effect the coiling action. After the pallet 132 has been filled with the coiled seeded chain 130, the strip 117 is broken and the loaded pallet 132 is moved in the direction of the arrow 134 to the germination station 135. The germination station 135 is typically low-light with high moisture and appropriate temperature conditions to encourage germination of the seeds deposited in the seed pockets 115. After germination, which typically requires three to four days, the pallet 132 carrying the coiled sprouted chain 140 of plugs with the small plant tops 138 growing therefrom may be moved either in the direction of the arrow 136 onto the plant turning machine 141 disposed in a greenhouse or in the direction of the arrow 137 to a greenhouse, in both cases the sprouted plants being grown to transplant size and thereafter delivered to the field transplanter 160.

If the coiled sprouted chain 140 is delivered in the direction of the arrow 136, the pallet 132 thereof is placed in a loading station 142, and specifically on a mount 143 thereat. The mount 143 is supported by a stand 144 that accommodates both rotation of the mount 143 about the center thereof and the tilting of the mount 143 with respect to the stand 144. In this way the coiled sprouted chain 140 with the sprouts 138 growing from the plugs thereof can be fed onto a growing cylinder 145 forming a part of the plant turning machine 141. The growing cylinder 145 rotates upon an axle 146 in the direction of the arrow 147, details of the construction and operation of such a growing cylinder 145 and associated plant turning machine 141 being illustrated in U.S. Pat. No. 3,882,634 granted May 31, 1975 to Richard R. Dedolph and U.S. Pat. No. 3,973,353 granted Aug. 10, 1976 to Richard R. Dedolph, the disclosures of which are incorporated herein by reference.

After several days on the plant turning machine 141, the small plant tops 138 grow to transplant size, i.e., juvenile plants 151 are established in the soil plugs, at which time it is desired to unload the coiled chain 150 of the plugs with transplant size plants 151 therein from the cylinder 145. To this end an unloading station 152 is provided having a mount 153 to receive the pallet 132. The mount 153 is supported by a stand 154 that accommodates both rotation of the mount 153 about its center and pivoting of the mount 153 with respect to the stand 154. The chain 150 is removed from the cylinder 145 and placed on a pallet 132, the chain 150 being coiled upon the pallet 132. The coiled chain 150 is then transferred from the unloading station 152 in the direction of the arrow 157 to the field transplanter 160.

As illustrated, the transplanter 160 has two pallet mount stations 165 (disposed to the lower right in FIG. 1), the pallet mount stations 165 receiving the pallets 132 with the coiled chain 150 of plugs carrying plants 151 of transplant size therein. In unloading the soil plugs 111 from the pallet 132, the pallets are respectively rotated in the directions of the arrows 166 and 167 and the chains 150 emerge as parallel straight rows of interconnected soil plugs moving in the direction of the arrow 168.

In order to ensure that only soil plugs 111 with transplants, are planted, a detector station 170 is provided to detect those soil plugs 111 with no plants 151 therein. More specifically, two detectors 172 and 173 associated respectively with the two rows of soil plugs are provided, the detectors 172 and 173 being actuated by interruption of a light beam from a light source 174. If the light beam from the source 174 is not interrupted by a plant 151, then the soil plug 111 is ejected at the appropriate ejector station 175 as indicated by the arrows 176.

After passing the detector station 170 and the ejector station 175, the plants pass to parallel plant conveyors 180 which are formed as continuous chains with spaced-apart pairs of fingers 181 carried thereby and arranged to receive a soil plug 111 therebetween. The conveyors 180 feed the plugs to planting wheels 185 that are equipped with grippers that grip the plugs 111 and carry the plugs downwardly for depositing in an appropriate opening in a soil list 190. The planting wheels 185 serve to place the plugs 111 in an upright position to provide two planted rows 195 disposed essentially parallel to each other, with individual soil plugs 111 in one of the rows 195 being staggered with respect to the soil plugs 111 in the other row 195. Disposed adjacent to the conveyors 180 are knife mechanisms (not shown) which cut the strip 117 between adjacent soil plugs 111 before the soil plugs 111 are fed to the grippers on the respective planting wheels 185.

It will be appreciated that instead of the transplanter 160 using planting wheels 185, a planter such as that illustrated in the Huang et al. U.S. Pat. No. 3,446,164 may be used.

It will be appreciated that the field transplant system 100 of FIG. 1 does not at any point therein touch or handle any portion of the plant top disposed in the soil plug 111, i.e., neither the small plant top 138 nor the top of the transplant size plant 151 are handled by any device, mechanical or manual, during the entire planting, growing and transplanting cycle. Instead, the resilient polymerized soil plugs 111 are utilized to move, handle and manipulate the combination of the soil plug 111 and the associated plant throughout the system. Furthermore, the integrity of the polymerized soil plugs 111 is independent of the size, shape and condition of the transplant therein, the soil plugs 111 being held together and maintaining their physical integrity due to the polymerized spongy resin content thereof.

Accordingly, the plants 151 going to the transplanter may be of the ideal transplant size, and more specifically are a size wherein the first true leaf is only partially expanded, or at the most is fully expanded. In the case of lettuce, that means that the plant is only fifteen days old or in the case of celery the plant may be only thirty days old. Several advantages result from using such small transplants. First, the root system is less fully differentiated so that many of the roots on the transplant are hair roots and therefore water absorbing, useful in supplying adequate water to the plant during and immediately after transplant. Since the plant is small, the top leaves of the plant are also small, and therefore do not place as great a water demand upon the root system; as a consequence, there is less wilting of the plant during and immediately after transplanting. In the present system, the spongy open-celled character of the stabilized soil plugs 111 also permits a substantial reservoir of water to be accumulated therein for each plant immediately prior to transplanting, thus further to take care of the water demand of the plant immediately after transplanting. In addition, the growth system of the small plant has not yet been physioligically modified so as to make it dependent upon the sophisticated greenhouse growing conditions. All of these factors contribute to eliminate "transplanting shock" and maintain uninterrupted the normal growth and development of the plant. On the contrary, the transplant is provided with the best start possible thereby permitting it to best utilize its genetic potential in the development of the mature plant. As a result, in the case of head lettuce, a more full and dense head is provided at maturity, the total time to reach maturity from seed being the same or slightly less using the present system as compared to direct seeding methods. Less field time is required since the transplant is already fifteen days old when taken to the field and physiologically more mature than a field seeded plant of the same age, thereby reducing field time by at least a corresponding amount. Finally, since the plant has not had the parts throughout fully differentiated at the time of transplanting, even if the transplant is put in the field soil at an angle of as much as 45° with respect to the vertical, the stalk will straighten up and grow upright without deforming the mature plant.

Referring next to FIGS. 2, 3 and 11 of the drawings, there are illustrated the details of the plug forming machine 200 useful in producing the chain 110 of plugs 111 described above with respect to FIG. 1 of the drawings. The machine 200 includes a bottom mold 201 in the form of a continuous belt 202 that is formed of flexible material or of individual sections suitably hinged so as to be supported and driven by the drive rollers 207 supported on the axles 208, the drive rollers 207 rotating in the direction of the arrows 209. The belt 202 carries a plurality of longitudinally spaced apart mold members 203, the details of which are best illustrated in FIG. 11 of the drawings. Each mold member 203 has a generally cylindrical body 204 suitably secured to the belt 202 and extending therefrom with the axis of the body 204 essentially normal to the surface of the belt 202. Disposed centrally of the body 204 is a projection 205 that is also cylindrical in shape with a length slightly greater than its diameter and centered with respect to the body 204. A conical surface 206 extends from the projection 205 outwardly to the outer periphery of the body 204. The projection 205 serves to mold the seed pocket 115 as will be more fully discussed hereinafter.

Since the mixture molded against the mold member 203 includes a plastic resin and a soil mix, it is necessary to clean the mold members 203 after removing the soil plugs 111 therefrom and to this end a water spray and brushing mechanism and station generally designated by the numeral 210 is disposed below the lower reach of the belt 202 and to the left as viewed in FIG. 2.

After leaving the water spray and brushing station 210, the mold members 203 enter a release agent coating station 211 where a release agent (to be described more fully hereinafter) is applied to the surfaces of the mold members 203, and particularly those surfaces against which the soil plugs 111 are molded. Since the release agent at station 211 is applied in the form of an aqueous suspension or dispersion, a release agent drying station 212 is provided so as to dry the water and leave only the release agent on the molding surfaces of the mold members 203.

The upper reach of the belt 202 has disposed on either side thereof a side mold 220, each of the side molds 220 including a continuous belt 222 which may be formed of a single flexible member or a plurality of hingedly interconnected members. Each of the belts 222 is supported by a pair of drive rollers 227 that are in turn supported by axles 228, the drive rollers 227 serving to drive the belts 222 in the directions of the arrows 229. Mounted on each of the belts 222 is a series of mold members 223 which are essentially formed as half cylinders and with a height slightly greater than that of the soil plugs 111 to be formed therein.

As is best seen in FIG. 3, the upper reach of the bottom mold 201 and the inner reaches of the side molds 220 come together to the right in FIG. 3 to form mold cavities in which are to be molded the soil plugs 111. The mold cavities move from right to left in FIG. 3 with the various mold members separating at the left and with the chain 110 of plugs 111 proceeding to the left from the left hand end of the machine 200.

Since the mold members 223 will be exposed to resin and soil mix, they will become soiled and it is necessary to clean the same. To this end each of the side molds 220 is provided with a water spray and brushing station 230 so as to clean the mold surfaces on the mold members 223. After cleaning, each of the mold members has applied at least to the molding surfaces thereof a release agent at a release agent coating station 231. Since the release agent is applied in the form of a aqueous suspension or dispersion, a release agent drying station 232 is provided to remove the water and leave the release agent covering the molding surfaces of the mold members 223.

To the right in FIG. 3 and just before the joinder of the mold members 203 and 223 to form the molding cavities, the strip 117 is supplied from a roll 234 thereof and between the side molds 220 but spaced downwardly from the upper edge of the side molds 220 a short distance as is best seen in FIG. 2. After insertion of the strip 117 between the side mold members 223, the mold cavity with the strip 117 therein passes under a hopper 235 in which is disposed a supply of a slurry including the resin and soil mix used in forming the soil plugs 111. The hopper 235 is provided with a nozzle 236 which emits a stream 237 of molding slurry. The stream 237 moves in the direction of the arrow 239 and around the strip 117 into the mold cavities in order to provide the material for forming the soil plugs 111 within the mold cavities. It will be appreciated that the molding mix in the stream 237 falls downwardly and upon the mold member 203 which is disposed in the bottom of the mold cavity, the projection 205 serving to form the seed pocket 115 and the conical surface 206 forming the downwardly inclined wall that joins the outer periphery of the soil plug 111 and the seed pocket 115. As the mold members 203 and 223 move from right to left in FIG. 3, the slurry within the molding cavities expands and begins to set up and any excess material that foams up beyond the upper surfaces of the side molds 220 is removed by a striking belt 240 (see FIG. 2 also) which is moving in the direction of the arrow 241 to remove from the upper ends of the mold cavities any excess polymerized soil mix.

There emerges from the left hand end of the machine 200 in FIG. 3 a chain of individual soil plugs 111 interconnected by a continuous strip 117, the upper ends of the plugs 111 being essentially flat due to the action of the striking belt 240 and the lower ends of the plugs 111 having molded therein seed pockets 115 and inclined surfaces due to the projection 205 and inclined surface 206, respectively, on the mold members 203. The mold belts 202 and 222 separate at the left end of the machine 200 in FIG. 3 and then pass respectively by their water spray and brushing stations, release agent coating stations and release agent drying stations, so that when the belts 202 and 222 reach the right hand end of the machine 200 in FIG. 3, the molding surfaces are clean and coated with release agent and ready again to be assembled to form mold cavities. In this fashion the chain 110 of plugs 111 can be molded to any desired length, all in a continuous manner.

Referring to FIGS. 4, 5 and 6, there is illustrated a first modification of a chain 120 of plugs 121 made in accordance with and embodying the principles of the present invention. The soil plugs 121 can be made using the machine 200 by simply modifying the shape of the molding surfaces in the various mold members 203 and 223 thereof. The plugs 121 each include a cylindrical side 122 and a flat bottom 123 and a top 124. Disposed centrally at the top 124 is a seed pocket 125 which is generally cylindrical in shape end concentric with the side 122. Joining the upper edge of the seed pocket 125 and the top 124 is a generally conical sloping surface 126. A strip 127 of felted material interconnects adjacent ones of the plugs 121, the strip 127 being disposed a short distance above the bottoms 123 of the plugs 121 and extending approximately half way up each of the plugs 121. Also interconnecting adjacent plugs 121 in the chain 120 are connecting portions 128 (see FIG. 6 particularly) that are somewhat in the form of a truncated cone in section and formed of the same material as the bodies of the soil plugs 121.

In a constructional example of the chain 120 of soil plugs 121, the soil plug 121 has a diameter of 0.50 inch and a height of 1.19 inch, the seed pocket 125 has a depth of 0.25 inch and a diameter of 0.20 inch, while the inclination of the conical surface 126 to a plane normal to the longitudinal axis of the soil plug 121 is 22° (and may vary from about 15° to about 25°) and the distance between the top 124 and the juncture of the upper edge of the seed pocket 125 and the surface 126 is 0.0625 inch. Each soil plug 121 has a volume of 4.59 cc. or 0.2794 cu. in. The strip 127 is 0.75 inch wide and is formed of polyester plastic with felted random fibers, the tape 127 being permeable by the resin molding slurry so as to be integrally molded into the associated plugs 12.

The soil plugs 111 and 121 with the seed pockets 115 and 125 respectively therein provide an ideal structure for uniform germination of seeds placed in the seed pockets thereof. More specifically, more uniform germination of the seeds is obtained and a higher proportion of seeds are germinated using the plugs with the seed pockets of the present invention. The seeds when placed in the seed pockets may either be naked or coated. In any event, there is good contact between the seed and the surface of the soil plug on which the seed is disposed. Water in the environment is collected upon the inclined surface 126 for example, and directed into the associated seed pocket 125 so as to supply water directly to the seed disposed in the seed pocket 125. Yet any excess water that falls in the seed pocket 125 is promptly drained away by the spongy character of the soil plug 121. However, the spongy character of the soil plug 121 does retain moisture in the portions thereof about the seed pocket 125 so as to maintain moist conditions continually in the seed pocket 125. Accordingly the water conditions about the seed in the seed pocket 125 are ideal for the germination purpose. The ideal water conditions are accomplished while still providing ready access of air to the bottom of the seed pocket 125 in which the seed is disposed. Access to air is necessary since the seed requires oxygen to carry out its growth activities during sprouting, the sprouting seed having little photosynthesis capability, whereby the life processes require oxygen. Summarizing, ideal germination conditions are provided by the soil plugs 111 and 121 in the associated seed pockets 115 and 125, respectively.

The material of the soil plugs 121 is preferably that disclosed in the copending application of U.S. Letters Patent Ser. No. 603,753 filed Aug. 11, 1975, now U.S. Pat. No. 4,034,508 (the disclosure of which is incorporated herein by reference), a typical such material comprising soil mixture (50% moisture by weight) in the amount of 32.7 lbs. formed essentially of peat soil (80% by weight) and vermiculite (20% by weight), polyurethane resin-forming solution of 9.6 lbs. (66% by weight polyurethane resin in acetone), 57.7 lbs. of water being added to form the slurry in the stream 237. The resultant soil plug 121 is a polyurethane resin foam forming a continuous phase throughout the soil plug, the foam being spongy, open-celled and hydrophilic in character. The soil particles are dispersed throughout the polyurethane foam, yet water in the polyurethane foam has access to the soil particles so that the soil particles perform the usual soil functions during the growth of the plants in the soil plugs 121. Each soil plug 121 has an apparent density of about 0.2 gms. per cc., and may vary from about 0.18 gms. per cc. to about 0.3 gms. per cc. The soil plug 121 can absorb about three times its weight of water, thereby demonstrating that the soil plug 121 is open-celled and has a substantial volume of voids therein.

It is important that the proper release agent be used in the molding machine 200 in order to carry out the requirements of the field transplant system 100 of the present invention. The active ingredient in the release agent used in the present invention is Food Grade Lecitin (granular in form), this material exhibiting a complete lack of phytotoxicity as used herein, whereby the presence of quantities thereof on the surface of the soil plugs in no way inhibits the growth of plants thereon and therein. In a preferred form of release agent in accordance with the present invention, 400 gms. of lecithin are placed in 400 ml. of acetone. The volume is then brought up to 4,000 ml. by adding water, this serving to produce a dispersion of lecithin in the acetone-solution. The resultant dispersion is permitted to digest at ambient conditions for a period of from about 24 hours to about 72 hours with occasional agitation to produce a colloidal dispersion of lecithin in an acetone-water solution, the dispersion being colloidal in character since it exhibits the Tyndall effect characteristic of such colloidal dispersions. In using the resultant release agent, the surfaces of the mold members that are to come into contact with the prepolymer in the molding slurry have applied thereto the dispersion such as by spraying at the release agent coating stations. Thereafter the mold member surfaces are dried at the release agent drying stations or may be used moist, thus leaving a thick coating of lecithin on the molding surfaces. More specifically, the thickness of the lecithin layer may be from about 0.001 mm. to about 1.0 mm., a preferred thickness being 0.05 mm.

It will be appreciated that either smaller or larger quantities of lecithin may be placed in the acetone solution, but one part by weight of lecithin is placed in at least an equal part by weight of acetone. Likewise, the volume may be brought from the 400 ml. of acetone to some volume greater or smaller than 4,000 ml. without departing from the present invention, from about six to twelve parts by weight of water being added for each part by weight of acetone. Isopropyl alcohol may be used in place of the acetone.

There is shown in FIGS. 7 and 8 of the drawings a further modified form of chain 320 of soil plugs 321 also made in accordance with and embodying the principles of the present invention. The chain 320 of plugs 321 can be made utilizing the machinery 200 of FIGS. 3 and 4 by modifying the shape of the molding surfaces in the mold members 202 and 222 thereof. Each of the plugs 321 is illustrated as being formed as a cylinder but with a hexagonal cross section formed of six essentially identical sides 322. Each of the plugs 321 has a flat bottom 323, a flat top 324, a seed pocket 325 cylindrical in shape and disposed centrally of the top 324, and a sloping conical surface 326 interconnecting the upper edge of the seed pocket 325 and the top 324. Interconnecting the plugs 321 is a strip 327 identical in construction and composition to the strip 127 described above. Also interconnecting the individual soil plugs 321 are connecting portions 328 formed of the same material as the soil plugs 321 and shaped essentially like the connecting portions 128 described above with respect to the chain 120 of soil plugs 121. The general dimensions of the parts and the materials of construction of the parts of the chain 320 are like those of the chain 120 described heretofore.

There is illustrated in FIGS. 9 and 10 of the drawings a modified form of strip 310 useful in forming chains of individual soil plugs. The strip 310 is formed of an elongated sheet or tape formed of fiber glass filaments coated with a thermosetting resin. More specifically, a sheet 311 of such material is provided and is folded essentially along the longitudinal center line thereof to provide a first portion 312 and a second portion 313 connected by a longitudinally extending fold or bight 314. Disposed in the bight 314 is a cord 315 that may be formed of fiber glass or a monofilament or other high strength material. The two portions 312 and 313 are heat sealed together by setting the thermosetting resin thereon, and also openings 316 are formed therein having diameters of approximately 0.05 inch. The strip 310 has unusual strength and is useful when substantial longitudinal tension is to be placed on the strip interconnecting the individual soil plugs during the handling thereof.

Referring again to FIG. 1A, there is shown an alternative form for coiling a continuous chain of plugs 111 joined by a strip 117, and more specifically there is shown a coiled chain 330 on a rectangular pallet 332, the chain 330 being coiled in a rectangular fashion with adjacent rows being displaced half the width of a plug so as to provide nesting thereof.

In certain instances it may be desirable to mold the seed directly in the soil plug rather than to drop a seed or coated seed into the seed pocket 115 as at the seeding station 106 in FIG. 1. Referring to FIGS. 12, 13 and 14 there is illustrated a modification of the molding machine 200 useful in directly molding a seed into a soil plug, this modification of the soil plug forming machine being designated by the numeral 250. Referring first to FIG. 13, it will be seen that the bottom mold 251 has been modified. The usual belt 252 like the belt 202 has been provided carrying a plurality of longitudinally spaced apart mold members 253 each including a generally cylindrical body 254. Formed in the lowermost portion of the body 254 is a seed pocket 255 that is just large enough to receive the largest seed to be encountered therein. The edges of the seed pocket 255 are joined to the periphery of the body 254 by a conical surface 256 like the conical surface 206 described heretofore. Also communicating with the seed pocket is an air passage 257 that extends upwardly through the body 254 and belt 252.

Referring now to FIG. 12, it will be seen that the modified bottom mold 251, and particularly the mold members 253 thereon pass over a seed bin 260 and under a vacuum box 270 as the mold members 253 approach the right hand drive roller 207 and just before going therearound and up to join the mold members 223 of the side molds 220 to form the molding cavity, the vacuum box actually extending around a large portion of the periphery of the drive roller 207 and until the various mold members 253 arrive at essentially an upright position. As is best seen in FIG. 14, the seed bin 260 has a bottom wall 261 and opposed side walls 262 and carries a plurarlity of seeds 265, the seeds 265 preferably being essentially spherical in shape and to that end being coated as will be understood by those skilled in this art. The seeds 265 have a diameter such that they will fit within a seed pocket 255 in a mold member 253. The vacuum box 270 has a main wall 271 that extends in a direction essentially parallel to the path of travel of the belt 252 and a pair of depending side walls 272 carrying at the lower end gasket members 275 that make sliding and sealing contact with the adjacent surface of the belt 252. The main wall 271 has a coupling 273 therein connecting to a hose 274 that in turn is connected to a source of vacuum (not shown).

It will be appreciated from FIGS. 12 and 14 that when a mold member 253 is disposed in the seed bin 260 in position to engage a seed 265 in the seed pocket 255, vacuum is being applied from the vacuum box 270, and more particularly a stream of air is drawn in the direction of the arrows 276. Vacuum continues to be applied from the vacuum box 270 even after the mold member 253 leaves the seed bin 260, the vacuum continuing until the mold member 253 passes around the drive roller 207 and until the seed pocket 255 is disposed upwardly so that the seed 265 therein will be held in position by gravity. Thereafter as the mold member 253 moves to the left with the mold members 223 in position, a soil plug is molded around the seed 265 and traps the seed therein but at least partially exposed so as to assist in later germination of the seed 265.

There also is illustrated in FIGS. 15 and 16 of the drawings yet another method and apparatus for placing an individual seed in the seed pocket 255 described above, this system and method also using the vacuum 270 heretofore described. In place of the seed bin 260, there is provided a non-magnetic plate 280 formed for example of aluminum, below which is positioned a magnet 281 which may be either a permanent magnet or an electromagnet as desired. The individual seeds 285 (see FIG. 16) are coated with a dust 286 formed of magnetizable material or containing magnetizable material such as ferrite. When the seeds 285 with the coating 286 thereon are placed over the plate 280 with the magnet 281 therebeneath, the seeds 285 are oriented upwardly with the largest end disposed toward the plate 280 and the smaller end in position to be engaged by the mold member 253 to be received in the seed pocket 255 thereof. Application of vacuum from the vacuum box 270 pulls the seed 285 into the seed pocket 255, where after the seed is molded in the soil plug as described above with respect to the seed 265, the seed also being oriented in the soil plug.

There is illustrated in FIG. 17 of the drawings a modified form of soil plug forming machine 400 made in accordance with and embodying the principles of the present invention and particularly useful in molding a group or array of soil plugs including a mat 460 of soil plugs 461 as illustrated in FIGS. 18 and 19 of the drawings. The machine 400 includes a plurality of bottom molds 401 each provided with a lower flange 402, the molds 401 being connected by a conveyor diagrammatically illustrated by the arrows 410 for movement one after the other. Also mounted on the conveyor 410 is a corresponding plurality of top molds 420 whereby there is a top mold 420 for each bottom mold 401, the molds 401 and 420 cooperating to form molding cavities for molding a plurality of soil plugs. Associated with each of the bottom molds 401 and carried by the conveyor 410 is a position control mechanism 430 illustrated diagramatically in the form of a cam mounted on a shaft 431 and having a cam surface 432 eccentric with respect to the shaft 431. The mechanism 430 is useful in changing the relative positions between a bottom mold 401 and the associated top mold 420 as will be explained more fully hereinafter.

The plug forming machine 400 further has several stations including a mold filling station 405, an expansion and striking station 415, a steam chest providing a curing station 425 and a separating station 445. Disposed over the mold filling station 405 is mixing equipment 435 having a plurality of input streams 437 including the soil mix, resin, water and miscellaneous ingredients, and a discharge opening 436 from which issues an output stream 438, the stream 438 being a slurry of the materials required to form the soil plugs within the mold cavities provided by the molds 401 and 420. At the filling station, the control mechanism 430 places the upper end of the lower mold 401 at an intermediate position with respect to the vertical height of the top mold 420 so as to provide a plurality of cavities that can be filled with the slurry in the stream 438. As the molds 401 and 420 with the slurry therein moves from the station 405 to the station 415, the polyurethane resin in the slurry begins to set up the foam with a consequent accompanying expansion of the volume of the material in the mold cavity. To accommodate this expansion, the control mechanism 430 is operated to lower the bottom mold 401 with respect to the top mold 420. In the event that the material forming the soil plugs foams upwardly and over the top of the mold 420, a striking belt 440 is provided at the station 415 to remove excess soil plug material from the upper end of the mold 420.

The now partially cured soil plug still in the molds 401 and 420 move into the steam chest at the curing station 425 where the soil plugs are held for about 3 minutes at a temperature of 180° F., the time being variable from 15 seconds to 15 minutes with corresponding variation in the temperature from 250° F. to 150° F. This treatment serves to complete the curing of the polyurethane resin in the soil plugs so that leaving the steam chest at station 425 are fully cured soil plugs ready for subsequent processing. More specifically a group 450 of plugs has been formed and the control mechanism 430 is actuated to move the bottom mold 401 to its uppermost position thus to eject the group 451 of the plugs from the top mold 420. The molds 401 and 420 are then recycled through a cleaning and release agent applying system as described above with respect to the machine 200 and presented again at the mold filling station 405 to form the next group of plugs.

The group 451 of soil plugs is inverted as it leaves the separating station 445 and is placed upon a tray 452 that will serve as a carrier for the group of plugs 451. The tray 452 with the group of plugs 451 thereon is positioned upon a conveyor belt 453 supported by drive rollers 454. Positioned above the conveyor belt 453 at a seeding station 450 is a seeding mechanism 455 which is operative to deposit a single seed or any number of seeds on the upper end of each of the plugs 451, each of the plugs 451 in the group preferably having a seed pocket in the upper end thereof like the seed pocket 125 in the plugs 121 described heretofore. After being seeded, the plugs 451 are sent to the germination room while on the tray 452 and are then carried through the greenhouse operation and the field transplant operation as described heretofore with respect to the field transplant system 100 of FIG. 1.

Referring to FIGS. 18 and 19 of the drawings there is illustrated a mat 460 of soil plugs 461 that can be readily formed utilizing the machine 400 of the FIG. 17. More specifically, the top mold 420 may have slots formed in the upper portions of the walls defining the molding cavities to receive a grid of strips 470, whereby to mold the strips 470 integrally into the soil plugs 461. The geometry of the soil plugs 461 is best illustrated in FIG. 19 of the drawings wherein it will be seen that each plug 461 has a cylindrical side 462 provided with a flat bottom 463 and a top 464. The top 464 has a seed pocket or recess 465 centrally thereof and the upper edge of the seed pocket 465 is joined to the top 464 by a sloping conical surface 466. The size and shape of the seed pocket 465 and the surface 466 are preferably like those of the seed pocket 125 and the surface 126 described above with respect to FIGS. 4 to 6.

Spaced upwardly from the bottom of the soil plugs 461 are intersecting strips 470, whereby four ends of the strips 470 extend outwardly from and through the side 462 of a soil plug 461. Referring again to FIG. 18, it will be seen that an interconnected array of soil plugs 461 is there provided with the strips 470 interconnecting each soil plug 461 to each of the adjacent soil plugs 461. In certain cases it is desirable to unite the intersecting strips 470 such as at the junctures 471 to increase the stability of the strips 470 in their relation to the associated soil plugs 461. In addition the strips 470 have connecting portions 472 extending outwardly around the periphery of the mat 460. The left hand end of the mat 460 is provided with an end band 473 to which the adjacent connecting portions 462 are attached. Also provided are two side bands 475 substantially wider than the end band 473, the side bands 475 being suitably attached to the adjacent connecting portions 472. In addition, the side bands 475 have uniformly spaced openings 476 therein for a purpose to be discussed more fully hereinafter, but generally to assist in handling and holding the mat 460. In one preferred form of the invention, the strips 470 and the end band 473 and the side bands 475 are all formed of plastic and are suitably interconnected as by solvent welding, or alternatively, may be formed as a single entity by molding, stamping or the like.

Turning to FIGS. 20 to 22 of the drawings, there is illustrated a plant turning machine 500 having structure thereof specifically adapted to receive and hold the mat 460 of soil plugs 461 illustrated in FIGS. 18 and 19 of the drawings. The plant turning machine 500 includes an elongated cylinder 501 mounted upon an axle 502 that in turn is mounted upon a support 503, whereby the cylinder 501 may be turned about its longitudinal axis in order to accelerate the growth of plants as described heretofore with respect to the transplant system 100 of FIG. 1. The cylinder 501 has mounted longitudinally on the outer surface thereof four equiangularly arranged slides 510, each of the slides 510 having a plurality of fingers 511 extending therefrom, the fingers 511 having diameters and being spaced apart so as to receive thereover the side bands 475 on one of the mats 460. In order to hold the slides 510 in operative position upon the periphery of the cylinder 501, brackets 520 are provided, two brackets 520 for each slide 510. Each of the brackets 520 includes a mounting flange 521 suitably secured as by welding to the outer surface of the cylinder 501, a side flange integral with the mounting flange 521 and extending radially outwardly therefrom, and a retaining flange 523 integral with the side flange and extending over and restraining the associated slide 510, the two opposed retaining flanges 523 holding the associated slide 510 for sliding movement along the adjacent surface of the cylinder 501. In order to lock the slides 510 in the adjusted position, a locking member 515 is provided thereon cooperating with a locking recess 505 in the cylinder 501 (see FIGS. 21 and 22).

In order to mount one of the mats 460 upon the cylinder 501, one of the side bands 475 of the mat 460 is slipped over one of the slides 510 with the fingers 511 extending through the openings 476 in the side band 475, the seed pockets of the plugs 461 being disposed radially outwardly. The other side band 475 on the mat 460 is then slipped over an adjacent slide 510, and more specifically the fingers 511 on the slide 510 are inserted through the openings 476 in the other side band 475. In order to draw the mats 460 tight against the outer surface of the cylinder 501, the two engaged slides 510 are moved in opposite directions with respect to each other along the surface of the cylinder 501. This movement of the slides 510 serves to stretch the mat 460 taut against the surface of the cylinder 501. Watering openings (not shown) are provided in the cylinder 501 so as to water each of the plugs 461 during the turning of the cylinder 501 thus to grow the plants in the plugs 461.

While there have been described what are at present considered to be the preferred embodiments of the invention, it will be understood that various modifications may be made therein, and it is intended to cover in the appended claims all such modifications that fall within the true spirit and scope of the invention.

What is claimed is:

1. A polymerized soil plug for growing a plant therein from seed comprising a body of spongy open-celled hydrophilic polymer, a quantity of particles of soil mix distributed throughout said body of spongy polymer, and a quantity of foam-forming synthetic organic plastic resin being reacted in situ to form said body of spongy open-celled hydrophilic polymer binding said particles of soil mix therein and into a cohesive soil plug, said resin comprising from about 20% to about 80% by dry weight of said soil plug thereby to provide a unitary self-supporting polymerized soil plug, said soil plug having a generally longitudinally extending side wall and generally transversely extending end walls, one of said end walls having a seed receiving recess therein with the end wall sloping from adjacent to the periphery of said soil plug inwardly toward said seed recess, said inwardly sloping wall directing fluids into said seed recess during germination of the seeds therein.

2. The polymerized soil plug set forth in claim 1, wherein said soil plug is cylindrical in cross section normal to the longitudinal axis thereof.

3. The polymerized soil plug set forth in claim 1, wherein said soil plug is hexagonal in cross section normal to the longitudinal axis thereof.

4. The polymerized soil plug set forth in claim 1, wherein said inwardly sloping wall forms an angle of from about 15° to about 25° with respect to a plane normal to the longitudinal axis of said soil plug.

5. A polymerized soil plug for growing a plant therein from seed comprising a body of spongy open-celled hydrophilic polymer with a quantity of particles of soil mix distributed throughout said body of spongy polymer, a mixture of the soil mix and water having added thereto foam-forming synthetic organic plastic prepolymer thereafter reacted in situ to form said body of spongy open-celled hydrophilic polymer binding said particles of soil mix therein and into a cohesive soil plug, said polymer comprising from about 20% to about 80% by dry weight of said soil plug, said soil plug having an end wall thereon with a seed receiving recess therein, said end wall sloping from adjacent to the periphery of said soil plug inwardly toward said seed recess, said inwardly sloping wall directing fluids into said seed recess during germination of the seeds therein.

6. A polymerized soil plug for growing a plant therein from seed comprising a body of spongy open-celled hydrophilic polymer with a quantity of particles of soil mix distributed throughout said body of spongy polymer, said polymer comprising from about 20% to about 80% by dry weight of said soil plug, said soil plug having an end wall with a seed receiving recess therein, the end wall sloping from adjacent to the periphery of said soil plug inwardly toward said seed recess, said inwardly sloping wall directing fluids into said seed recess during germination of the seeds therein.

7. A polymerized soil plug for growing a plant therein from seed comprising a body of spongy open-celled hydrophilic polymer with a quantity of particles of soil mix distributed throughout said body of spongy polymer, a mixture of said particles of soil mix and foam-forming precursors of a thermosetting resin being reacted in situ to form said body of spongy open-celled hydrophilic polymer binding said particles of soil mix therein and into a cohesive soil plug, said polymer comprising from about 20% to about 80% by dry weight of said soil plug, said soil plug having an end wall with a seed receiving recess therein, the end wall sloping from adjacent to the periphery of said soil plug inwardly toward said seed recess, said inwardly sloping wall directing fluids into said seed recess during germination of the seeds therein.

* * * * *